United States Patent [19]

Lehtinen et al.

[11] Patent Number: 5,294,795
[45] Date of Patent: Mar. 15, 1994

[54] ARRANGEMENT FOR COUNTING LIQUID SCINTILLATION SAMPLES ON MULTI-WELL FILTRATION PLATES

[75] Inventors: Kauko Lehtinen, Raisio; Timo Oikari; Tapio Yrjönen, Both of Turku, all of Finland

[73] Assignee: Wallac Oy, Turku, Finland

[21] Appl. No.: 974,626

[22] Filed: Nov. 12, 1992

[51] Int. Cl.⁵ .................. G01T 1/203; G01T 1/204
[52] U.S. Cl. .................... 250/328; 250/364
[58] Field of Search .......... 250/362, 364, 328, 361 C; 356/244

[56] References Cited

U.S. PATENT DOCUMENTS

| | | | |
|---|---|---|---|
| 4,972,084 | 11/1940 | Potter et al. | 250/364 X |
| 5,043,581 | 8/1991 | Joss | 250/328 |
| 5,061,853 | 10/1991 | Lehtinen et al. | 250/364 X |
| 5,198,364 | 3/1993 | Oikari et al. | 250/364 X |
| 5,243,193 | 9/1993 | Suontausta et al. | 250/361 R |

*Primary Examiner*—Constantine Hannaher
*Assistant Examiner*—Edward J. Glick
*Attorney, Agent, or Firm*—Adduci, Mastriani, Schaumberg & Schill

[57] ABSTRACT

An arrangement for counting liquid scintillation samples on a sample plate in a liquid scintillation counter having at least one photomultiplier tube. The sample plate contains a plurality of open-bottomed wells sealed with at least one filtration membrane impregnated with a solid meltable scintillator. The arrangement includes a sample plate holder for holding and transporting the sample plate in the liquid scintillation counter. The holder includes a device to hold sample plates of different sizes and a device to enable transportation of the sample plate in the liquid scintillation counter.

5 Claims, 3 Drawing Sheets

FIG.1
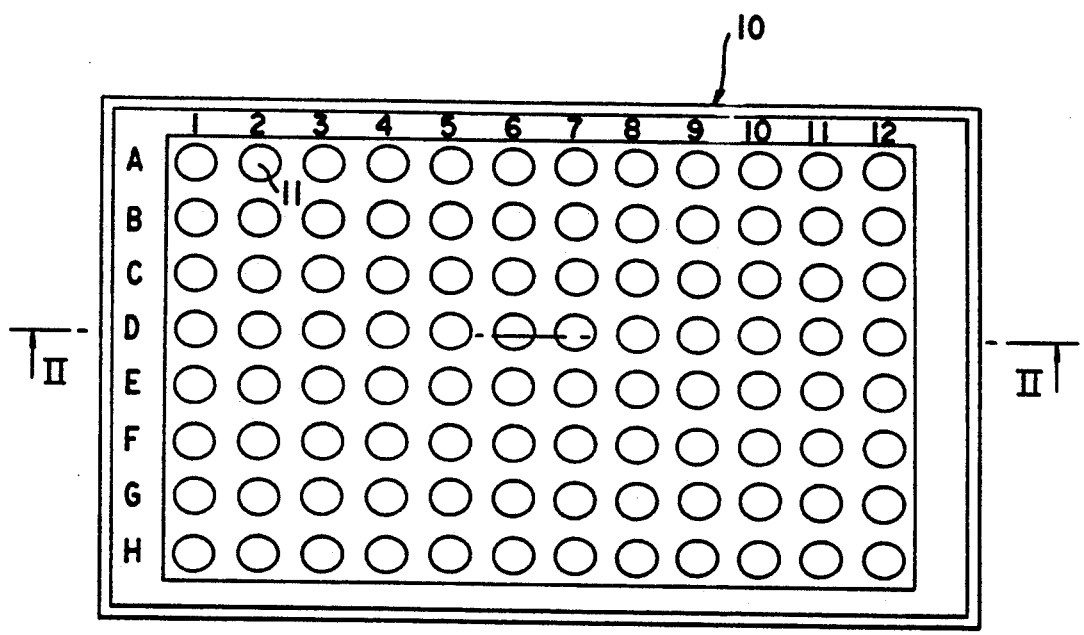
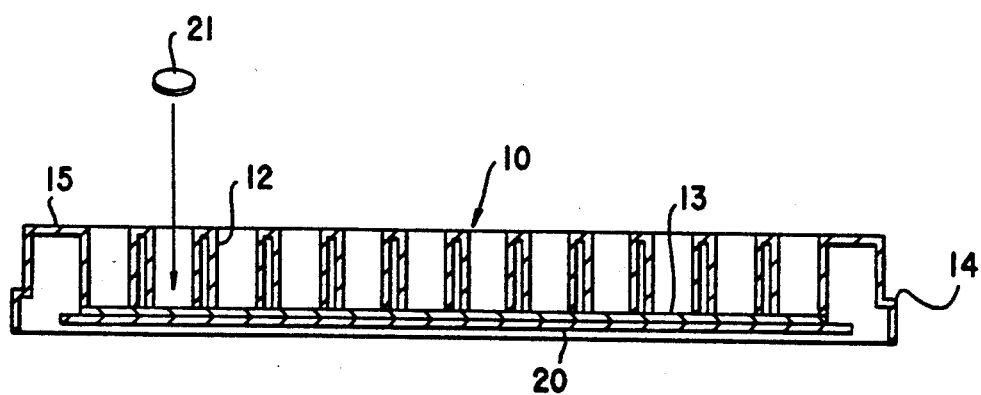
FIG.2A

ARRANGEMENT FOR COUNTING LIQUID SCINTILLATION SAMPLES ON MULTI-WELL FILTRATION PLATES

BACKGROUND OF THE INVENTION

Liquid scintillation counters are mainly used for measuring low energy beta radiation emitting samples, which are of, for example, biological or medical interest.

The range of the low energy beta particles in the sample is generally few tens of micrometers at the most. As a consequence, the sample to be measured has to be placed in direct contact with the scintillation medium, which comprises a solvent or solvents and a solute or solutes present in the solutions in a small percentage by weight of the solutions. In this interaction process most of the kinetic energy of the interacted beta particle is absorbed by the solvent and then transferred to the solute which emits scintillation photons, whose amount is proportional to the energy of the interacted beta particle. These scintillation photons are detected usually by two photomultiplier tubes operating in coincidence that produce electric pulses. The heights of the pulses are proportional to the amount of emitted scintillation photons and thus proportional to the energy of the interacted beta particle.

Traditional liquid scintillation counters are designed to count samples—one at a time—deposited with scintillation liquid into sample vials. The volume of the sample vial is typically 6 or 20 ml. The sample vials are deposited into vial racks, which have separate compartments for individual sample vials. The sample racks are placed on the conveyor of the automatic sample changer system of the counter.

Because the above mentioned liquid scintillation counter is designed to count vials, whose volume is up to 20 ml, serious difficulties are encountered, when the sample volume is only few hundred microliters or less. Typically, these samples are prepared in minivials which are then inserted into normal vials. In addition, the handling of separate sample vials is very time consuming and includes potential risks of mis-identification. The sample changing mechanism of such an instrument is also rather complicated, because the vial must be removed from the sample rack and must be positioned into a light tight radiation detection chamber, and after counting it must be returned to the same position in the sample rack.

A novel liquid scintillation counter, which counts samples directly from multi-well sample plates is shown in U.S. Pat. No. 5,061,853 (Lehtinen et al), which apparatus counts liquid scintillation or corresponding samples directly from sample plates which comprise several separate sample wells or vials. The apparatus has one or several detectors in order to count one or several samples at a time. The sample plate is placed in the counting position or a position prior to counting manually or automatically on a rigid plate holder made of photon attenuating material having holes for the wells of the sample plate. As a consequence, an optically isolated compartment is formed around each sample well of the sample plate. The walls of the holes are reflecting or scattering in order to guide the photons from the liquid scintillation sample to the detectors, which are built of two photomultiplier tubes operating in coincidence and situated on the opposite sides of the holes of the plate holder. The wells of the sample plate can be closed by an adhesive transparent tape. The apparatus can be used also for counting gamma radiation emitting samples if the holes of the sample plate are surrounded by gamma radiation sensitive detectors. A detailed construction of this kind of liquid scintillation counter is shown in International Patent Application no. PCT/FI90/00124 (Sonne et al.). Another novel scintillation counting system for in-situ measurement of radioactive samples in a multiple-well plate is presented in European Patent Publication Number 0425767A1 (VanCauter et al.). This apparatus is provided with multiple photomultiplier tubes positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to descriminate between pulses attributable to sample events within the wells and pulses attributable to non-sample events such as photomultiplier tube noise. The discrimination is effected by determining whether a selected number of electrical pulses occurs with a prescribed time interval, the occurrence of the selected number of pulses within the prescribed time interval signifying a sample event. Only the electrical pulses attributable to sample events are supplied to a pulse analyzer.

In International Patent Application No. PCT/FI89/00219 (Oikari and Yrjönen) a method is shown for performing liquid scintillation counting by a liquid scintillation counter that measures samples on a measurement support, such as a filter plate or like, which has the sample associated therein. According to the method the detection material, such as scintillator, is added to the measurement support before the measurement. The method according to the invention is characterized by adding detection material, such as scintillator, in melted form into the measurement support and performing the measurement after the detection material has solidified. In this present application this kind of detection material is called a meltable solid scintillator.

A commercial product of a 96-well test plate which is provided with open-bottomed wells individually covered with filtration membranes is manufactured by PALL Ltd., UK. In present patent application this kind of plate is called a multi-well filtration plate.

SUMMARY OF THE INVENTION

The present invention describes an arrangement for counting liquid scintillation samples on multi-well filtration plates by applying meltable solid scintillator.

BRIEF DESCRIPTION OF THE DRAWINGS

FIG. 1 shows a top view of a multi-well filtration plate provided with open-bottomed wells sealed with a filtration membrane impregnated with a solid meltable scintillator and having 96 sample wells in 8×12 matrix format.

FIG. 2A shows a cross-sectional view of a multi-well filtration plate according to FIG. 1 taken along line II—II in FIG. 1.

DETAILED DESCRIPTION OF THE PREFERRED EMBODIMENTS

Figure 2B:
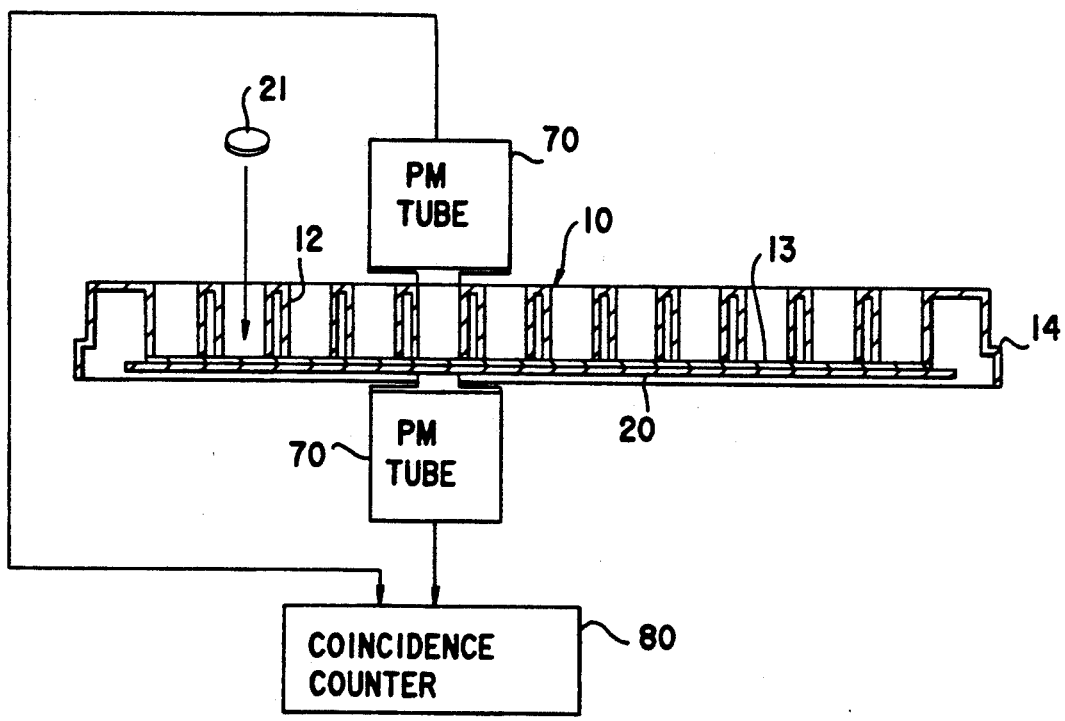
FIG. 2B illustrates a combination of a liquid scintillation counter with two photo-multiplier tubes and a multi-well filtration plate as shown in FIG. 2A.

In FIG. 1 there is shown a top view of a multi-well filtration plate 10 where 96 wells 11 are provided in 8×12 matrix format in a rigid plate. The walls 12 of the wells 11 are reflecting or scattering in order to guide the photons from the liquid scintillation sample to the detectors. FIG. 4A shows a side view of said 96-well sample plate taken along line II—II in FIG. 1. Said wells 11 are sealed from bottom side of the plate 10 with filtration membrane 13 impregnated with solid meltable scintillation.

There is illustrated in FIG. 2B the combination of a liquid scintillation counter comprising two photo-multiplier tubes 70 operating in coincidence and connected to a counter 80 for counting the scintillation photons emitted by the scintillation solute and a 96-well sample plate 10 as shown in FIGS. 1 and 2A. During operation, the sample plate is held in place by an adaptor (not shown).

The following steps are taken in order to prepare said filtration plate 10 for counting in the liquid scintillation counter:

1. Said filtration membrane 13 on the bottom of said multi-well filtration plate 10 is covered by a transparent adhesive foil 20.
2. A piece of meltable solid scintillator 21 is placed into each sample well 11.
3. Said sample plate 10 provided with meltable scintillator 21 in each well 11 is heated in order to impregnate meltable solid scintillator into said filtration membrane 13.

or

1. Said filtration membrane 13 on the bottom of said multi-well filtration plate 10 is impregnated by meltable solid scintillator by immersing said membrane 13 in melted solid scintillator.
2. Said filtration membrane 13 impregnated by said meltable solid scintillator is covered by a transparent adhesive foil 20.

Figure 3:
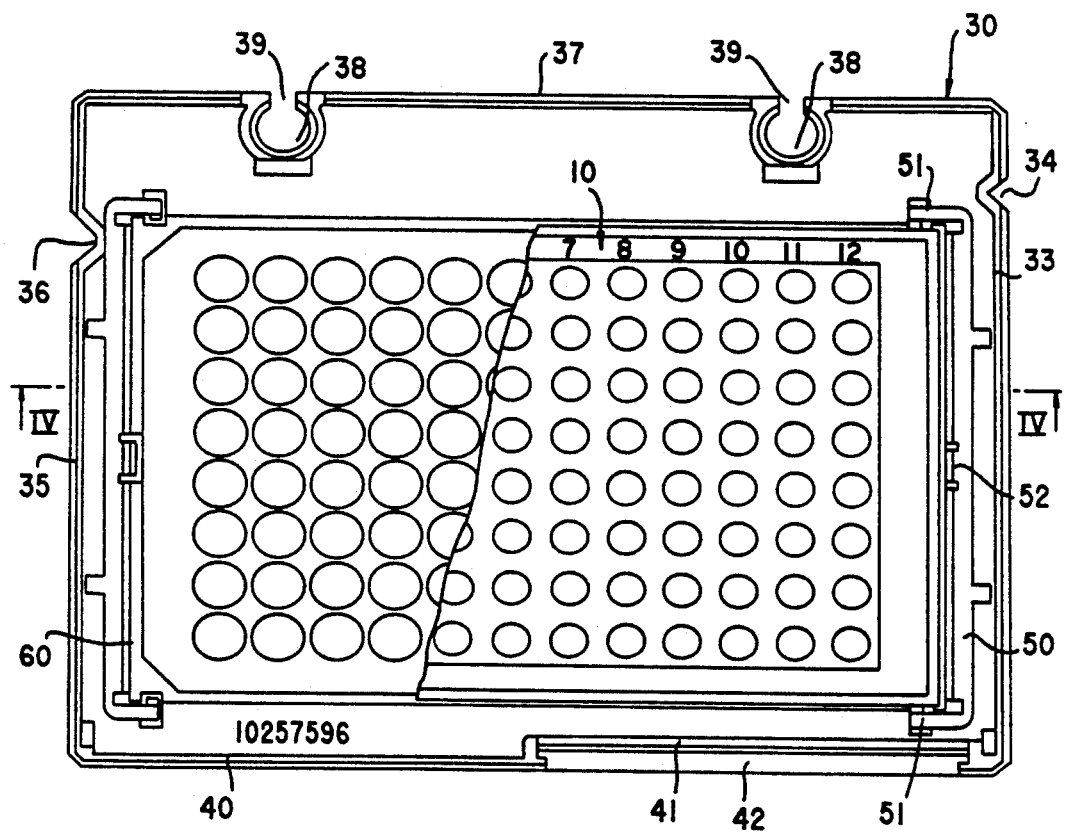
FIG. 3 shows a top view of a sample plate holder and a part of a multi-well filtration plate according to FIG. 1.

FIG. 3 shows a sample plate holder 30 for counting liquid scintillation samples on the 96-well filtration plate 10 shown in FIG. 1 and 2 produced by an injection molding process from a light-impermeable material with high degree of reflectivity for scintillation light, for example a special-grade polycarbonate plastic containing high amount of white pigment.

Figure 4:
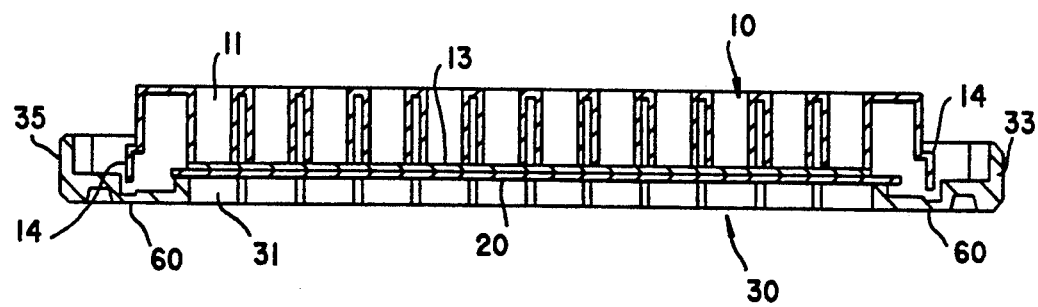
FIG. 4 shows a cross-sectional view of a sample plate holder and a multi-well filtration plate taken along line IV—IV in FIG. 3.

FIG. 4 shows a side view of the 96-well sample plate holder taken along line IV—IV in FIG. 3 with a 96-well filtration plate 10. The sample plate holder 30 is provided with circular through-holes 31 corresponding respectively to the wells 11 of the filtration plate 10.

As shown in FIG. 3 and FIG. 4, said sample plate holder 30 is provided with the first adaptation means 50 to engage the filtration plate 10 in a single position. Said adaptation means 50 comprises elastic lips 51 and a spring tab 52 in order to compensate for variations in the outer diameters of the sample plate 10 and a groove 60 in order to allow variations in the height of the shirt 14 of the filtration plate 10.

the second adaptation means comprising two identical pivot holes 38 at the rear side 37 of the sample plate holder 30 from its top to its bottom with open slits 39 adapting said sample plate holder 30 to the transportation system of the liquid scintillation counter described in detail in International Patent Application No. PCT/FI90/00124 (Sonne et al.) and the first slot 34 at the right side 33 of the sample plate holder 30 is used in order to secure the correct position of the sample plate holder 30 in the storage compartment of said liquid scintillation counter and the second slot 36 at the left side 35 of the sample plate holder 30 for distinguishing different kinds of sample plates by the control system of the liquid scintillation counter according to the distance of the slot 36 from the rear side 37.

In addition the front side 40 of the sample plate holder 10 is provided with means 41 for carrying a detachable support plate 42, on which support plate at least one bar code label can be attached.

The invention is not confined to the above embodiments alone, but it may show even considerable variations within the scope of the patent claims.

We claim:

1. An arrangement for counting of liquid scintillation samples comprising in combination
   (a) a liquid scintillation counter comprising at least one photomultiplier tube,
   (b) a sample plate comprising (i) a plurality of open-bottomed wells and (ii) a filtration membrane which covers the bottoms of said wells and is impregnated by a solid meltable scintillator so as to seal said wells,
   (c) an adapter having a first adaptation means for compensating for variations in the size of said sample plate and a second adaptation means for adapting said sample plate for transportation.

2. An arrangement according to claim 1 wherein said adapter is a sample plate holder and said first adaptation means comprises elastic lips and a spring tab in order to compensate for variations in the outer diameter of said sample plate and a bottom groove in order to allow for variations in the height of a skirt of said sample plate.

3. An arrangement according to claim 1 wherein said adaptor is a sample plate holder and said second adaptation means comprises two pivot holes with open slits on one side of the sample plate holder.

4. An arrangement according to claim 1 wherein said adaptor is a sample plate holder and said second adaptation means comprises a first slot on a first side of the sample plate holder and a second slot on a second side of the sample plate holder.

5. An arrangement according to claim 1 wherein the filtration membrane is covered by transparent adhesive foil.

* * * * *